United States Patent Office 3,485,915
Patented Dec. 23, 1969

3,485,915
THICKENED HYDROXYPROPYL CELLULOSE COMPOSITIONS
Terry Gerstein, Brooklyn, and William Perlberg, Bellmore, N.Y., and Milton H. Schwarz, Westport, Conn., assignors to Revlon, Inc., New York, N.Y., a corporation of Delaware
No Drawing. Filed Apr. 22, 1966, Ser. No. 544,365
Int. Cl. A61l 23/00; A61k 7/00
U.S. Cl. 424—81                                    5 Claims

ABSTRACT OF THE DISCLOSURE

Aqueous and/or alcoholic compositions suitable for topical application to the skin and comprising, as thickening agents, about 0.1 to about 5 percent by weight of a neutralized carboxy polymer, and about 0.1 to about 2 percent by weight of hydroxypropyl cellulose.

The present invention relates to improved thickened compositions, particularly aqueous, alcoholic or aqueous-alcohol liquid preparations and gels useful as carrier vehicles in cosmetic and other preparations for topical application to the skin, including the scalp and hair, and to methods for making the thickened compositions.

Compositions thickened according to the invention are particularly useful in cosmetrics such as after-shave preparations, cleansing liquids and gels, hairdressings, and the like.

U.S. Patent 2,798,053 granted July 2, 1957 to Brown discloses carboxylic polymers widely available commercially as thickening and gelling agents. The polymers described in the patent, which is incorporated herein by reference, comprise a carboxylic monomer copolymerized with a polyalkenyl polyether of a polyhydric alcohol containing at least four carbon atoms and at least three hydroxyl groups. Other mono-olefinic materials may be incorporated into the polymer. As disclosed in the patent, particularly useful water-sensitive cross-linked interpolymers are prepared from a monomer mixture comprising (1) at least 40 percent by weight of a monomeric, polymerizable, α-β-mono-olefinically-unsaturated lower aliphatic carboxylic acid, 0 to 60 percent by weight of a different olefinically unsaturated monomer copolymerizable with said α-β-unsaturated acid, and (2) from about 0.1 to about 10 percent, preferably from about 0.1 to about 5 percent, by weight of the other monomers, of a polyalkenyl polyether of a polyhydric alcohol, said polyether containing more than one alkenyl ether grouping per molecule, and the parent polyhydric alcohol containing at least 4 carbon atoms and at least three hydroxy groups. Large numbers of suitable α-β-unsaturated carboxylic acids, of monomers copolymerizable therewith, and of polyalkenyl polyethers are disclosed in the aforementioned Brown patent. Particularly useful acids are monoolefinic acrylic acids, as therein defined. Particularly useful polyethers are the polyethers of a polyol selected from the group consisting of oligosaccharides, reduced derivatives thereof in which the carbonyl group is converted to an alcohol group, and pentaerythritol, the hydroxyl groups of said polyol which are modified being esterified with allyl groups, and said polyol having at least two allyl groups per polyol molecule.

These carboxy polymers are generally employed in amounts between about 0.1 percent to about 5 percent or more by weight in aqueous, alcoholic, or aqueous alcoholic compositions to cause thickening. The polymers do not attain their maximum volume in water until converted to a partial alkali metal, ammonium, or amine salt and are generally employed in salt form. As taught in the patent, the ratio of volume to unit weight of the polymer in distilled water gradually increases to a maximum as the percentage of neutralization is increased in the range from 50 to 90 percent, and then decreases. A variety of neutralizing agents, including monovalent alkalis such as sodium, potassium, lithium, or ammonium hydroxide or their carbonates and bicarbonates, or mixtures thereof, and amine bases having a primary, secondary, or tertiary amino group are suitable neutralizing agents. Neutralization with an alkali metal hydroxide to the extent of about 75 percent, or with ammonia to full neutralization, produces a pH of about 7, which is particularly desirable in compositions for topical application to the skin. Materials having a pH greater than 7, e.g. compositions such as hair-waving gels, are included in the present invention. The carboxy polymers in such gels may be fully neutralized, and although some diminution in the volume to weight ratio may result from complete neutralization, highly useful gels are obtained. Accordingly, reference herein to "neutralized" carboxy polymers should be understood to include both fully neutralized and partially neutralized materials.

Despite the considerable utility of these carboxy polymers as thickening agents, when compositions containing these thickening agents or gelling agents are applied to the skin and rubbed the thickening agent tends to ball up, forming crumbs or pills on the skin. This balling effect is unaesthetic and undesirable. Although the effect can be reduced by reducing the concentration of thickening agent, there is a corresponding undesirable loss in the viscosity of the compositions.

U.S. Patent 3,210,251 granted Oct. 5, 1965 to Klug describes and claims certain liquid hair preparations containing hydroxypropyl cellulose products which are in turn claimed in a still-pending application of Klug, Ser. No. 257,064, to which reference is made in said Klug patent. The hydroxypropyl cellulose of the Klug patent is an alcohol-soluble, cold-water-soluble cellulose ether, distinguished in its alcohol solubility from materials such as hydroxypropyl methyl cellulose or ethyl cellulose, neither of which is alcohol-soluble, and is a thickening agent having an M.S. of 2.5–10 and a viscosity at 25° C. of 25 cps. to 500 cps. in a 5 percent and 2 percent aqueous solution respectively. (The M.S. is the average number of mols of hydroxypropyl reactant combined with the cellulose per anhydroglucose unit therein.) Methods of making water-soluble hydroxyalkyl cellulose ethers are taught in U.S. Patents 3,131,176 and 3,131,177.

A number of hydroxypropyl cellulose polymers of the kind described in the Klug patent are commercially available. Two polymers which have proved particularly useful are characterized by the trade names "Klucel HA" and "Klucel M," respectively having a viscosity of between 1500 and 2500 cps. in a 1 percent solution in water, and a viscosity of 4000 to 6500 cps. in a 2 percent solution in water, as determined at 25° C. using a Brookfield LVF viscometer.

These hydroxypropyl celluloses are normally employed in concentrations of about 0.1 to about 2 percent to thicken aqueous and/or alcoholic compositions. Gels can be formed using hydroxypropyl cellulose if it is used in the relatively large amount of about 5 percent, but gel compositions containing the thickening agent at this concentration tend to flake and are undesirably sticky.

According to the present invention, it has been found that combinations of a carboxy polymer as described and of a hydroxypropyl cellulose as described, in aqueous, alcoholic, and aqueous-alcoholic liquid and gel preparations permit thickening and gel formation without the undesirable and unaesthetic balling effect obtained using the carboxy polymer alone. Further, gels can be formed from the combination which do not flake and are not sticky, as would be the case if gels were made using the hydroxypropyl cellulose alone. The thickened liquid and gel compositions of the invention typically employ the carboxy polymer in amounts of from about 0.1 to about 5 percent by weight, preferably about 0.3 to about 1.5 percent, in combination with from about 0.1 to about 2 percent by weight, preferably about 0.2 to about 0.8 percent, of hydroxypropyl cellulose thickening agent.

The other contents of the liquid or gel compositions according to the present invention are not critical to achieving the desirable thickening or gelling effect obtained by a combination of the materials as herein disclosed. A wide variety of aqueous and/or alcoholic liquid and gel preparations, particularly cosmetic materials used by topical application to the skin, including the scalp and hair, are known in the prior art and have been formulated with the carboxy polymers of the Brown patent. All of these prior art compositions can be improved by elimination of the balling effect according to the invention by the inclusion therein of a hydroxypropyl cellulose thickening agent. Such compositions may additionally comprise the gamut of inert and active ingredients commonly employed in cosmetic, toiletries, and other preparations in liquid or gel form, and include perfumes, colorants, humectants, emollients, skin or hair conditioners, deodorants or anti-perspirants, sun screen agents, insect-repellants, pigments, fillers, depilatories, and the like. In particular, as is known in the art, the carboxy polymers and hydroxypropyl cellulose are compatible with numerous polyol materials commonly incorporated in cosmetic preparations as emollients, plasticizers, or auxiliary thickeners. These polyols include ethylene glycol, propylene glycols, glycerine, polyethylene glycol, polypropylene glycols, mixed polyethylene oxide-polypropylene oxide polymers, etc.

A better understanding of the present invention and of its many advantages can be had by referring to the following specific examples, given by way of illustration.

EXAMPLE 1

A thickened aqueous system or water mucilage useful as a carrier vehicle in various cosmetic and other preparations for topical application is prepared by stirring 0.5 part by weight of carboxy polymer thickening agent (commercially available under the trade name "Carbopol") and 0.5 part by weight of hydroxypropyl cellulose thickening agent (commercially available under the trade name "Klucel") into 195 parts by weight of water to form a thin dispersion. 2 parts by weight of a 10 percent solution of sodium hydroxide are added with mixing partially to neutralize the carboxy polymer with formation of a clear gel.

EXAMPLE 2

A similar alcohol-water system comprises 50 parts by weight of water, 50 parts by weight of alcohol (ethyl, methyl, or isopropyl alcohol, for example), 0.5 part by weight each of the carboxy polymer and hydroxypropyl cellulose, and 0.5 part by weight of triethyl amine.

EXAMPLE 3

A cosmetic after-shave gel was prepared by dissolving 0.2 part by weight of menthol in 45.0 parts by weight of ethyl alcohol. 53 parts by weight of water were added to the mixture. A mixture of 0.5 part by weight of carboxy polymer and 0.5 part by weight of hydroxypropyl cellulose was dispersed into the mixture. Subsequently, 0.4 part by weight of diisopropanol amine was added. A crystal-clear gel formed as the amine dissolved.

EXAMPLE 4

A hair-grooming gel was prepared by dispersing 1 part by weight of carboxy polymer and 1 part by weight of hydroxypropyl cellulose in 63.5 parts of ethyl alcohol. 18.0 parts by weight of isopropyl palmitate and 9.0 parts by weight of ethoxylated lanolin were added with the slow formation of a precipitate. 1 part by weight of di(2-ethylhexyl) amine were added, with solution of the precipitate. Finally, 5.5 parts by weight of water were added to form a clear thick gel. Perfume and color are added as desired.

EXAMPLE 5

A sun-screening gel was prepared by dispersing 0.5 part by weight of carboxy polymer thickening agent and 0.5 part by weight of hydroxypropyl cellulose in 48.0 parts of ethyl alcohol. 3 parts by weight of glyceryl-p-aminobenzoate, an ultraviolet absorber, were dissolved in the resulting dispersion. 0.045 part of monoisopropanol amine was added, followed by the slow addition of 47.91 parts by weight of water with stirring. A clear gel resulted. Perfume and coloring agents are added as desired.

EXAMPLE 6

An insect repellant gel was prepared by dispersing 6 parts by weight of carboxy polymer thickening agent and 4 parts by weight of hydroxypropyl cellulose thickening agent in 600 parts by weight of meta delphene. 4.5 parts by weight of an ethoxylated aliphatic amine ("Ethomeen C-25") were added to form a partial salt of the carboxy polymer. Finally, 100 parts by weight of ethanol were slowly added to the mixture with mild agitation. The whole mass gels slowly.

What is claimed is:

1. A thickened composition suitable for topical application to the skin comprising (1) water, a lower alkanol, or mixtures thereof, (2) about 0.1 to about 5 percent by weight of a neutralized carboxy polymer, and (3) about 0.1 to about 2 percent by weight of hydroxypropyl cellulose, said carboxy polymer (2) being a cross-linked interpolymer of a monomeric mixture consisting essentially of at least 40 percent by weight of a monomeric polymerizable alpha-beta monoolefinically unsaturated lower aliphatic carboxylic acid, from 0 to 60 percent by weight of a different olefinically unsaturated monomer copymerizable therewith, and from about 0.1 to about 10 percent, by weight of the other monomers, of a polyalkenyl polyether of a polyhydric alcohol containing at least 4 carbon atoms and at least three hydroxyl groups, and said hydroxypropyl cellulose (3) being a film-forming alcohol-soluble, cold water-soluble polymer having an M.S. of 2.5–10 and a viscosity at 25° C. of 25 cps. to 500 cps. in a 5 percent and 2 percent aqueous solution respectively.

2. A composition as in claim 1 wherein said corboxy polymer (2) is a cross-linked interpolymer of a monomeric mixture consisting essentially of at least 40 percent by weight of a monoolefinic acrylic acid, from 0 to 60 percent by weight of a different olefinically unsaturated monomer copolymerizable therewith, and from about 0.1 to about 5 percent, by weight of the other monomers, of said polyalkenyl polyether.

3. A composition as in claim 1 wherein said hydroxypropyl cellulose has a viscosity at 25° C. of 1500–2500 cps. to 4000–6500 cps. in a 1 percent and 2 percent aqueous solution respectively.

4. A composition as in claim 1 in the form of a gel.

5. A composition as in claim 1 in the form of an aqueous alcoholic gel.

References Cited

UNITED STATES PATENTS

| | | | |
|---|---|---|---|
| 3,427,382 | 2/1969 | Haefele | 424—71 |
| 2,798,053 | 7/1957 | Brown | 167—63 X |
| 2,810,659 | 10/1957 | Greminger et al. | 167—63 X |
| 2,840,485 | 6/1958 | Greminger et al. | 167—63 X |
| 2,923,692 | 2/1960 | Ackerman et al. | 167—63 X |
| 3,210,251 | 10/1965 | Klug | 167—87 |

(Other references on following page)

FOREIGN PATENTS 1,268,461  6/1961  France.
1,343,194  10/1963  France.

OTHER REFERENCES

Caver et al., American Journal of Pharmacy, vol. 129, Apr. 1957, pp. 118–122.

Levy et al., Drug and Cosmetic Industry, vol. 81, No. 5, November 1957, pp. 606–607 and 697–698.

Knectel, American Perfumer and Cosmetics, vol. 78, No. 10, October 1963, pp. 95–97.

Carbopol Supplement No. 3, July 1959, 4 page pamphlet.

ALBERT T. MEYERS, Primary Examiner

VERA C. CLARKE, Assistant Examiner

U.S. Cl. X.R.

8—161; 106—179, 189, 182, 197, 263; 260—29.6; 424—60, 65, 70, 73, 324, 362